(12) United States Patent
Chuck et al.

(10) Patent No.: US 12,215,591 B2
(45) Date of Patent: Feb. 4, 2025

(54) NACELLE INLET WITH HORIZONTAL DROOP (NIHD)

(71) Applicant: The Boeing Company, Chicago, IL (US)

(72) Inventors: Chen Chuck, Mercer Island, WA (US); Brian Scott Kornegay, Snohomish, WA (US)

(73) Assignee: The Boeing Company, Arlington, VA (US)

( * ) Notice: Subject to any disclaimer, the term of this patent is extended or adjusted under 35 U.S.C. 154(b) by 407 days.

(21) Appl. No.: 17/692,816

(22) Filed: Mar. 11, 2022

(65) Prior Publication Data

US 2022/0290580 A1    Sep. 15, 2022

Related U.S. Application Data

(60) Provisional application No. 63/159,708, filed on Mar. 11, 2021.

(51) Int. Cl.
*F01D 25/24* (2006.01)
*B64C 7/02* (2006.01)

(52) U.S. Cl.
CPC ............... *F01D 25/24* (2013.01); *B64C 7/02* (2013.01); *F05D 2220/323* (2013.01); *F05D 2230/60* (2013.01)

(58) Field of Classification Search
CPC ..... F01D 25/24; B64C 7/02; F05D 2220/323; F05D 2230/60; F05D 2250/314; B64D 29/02; F02C 7/04
See application file for complete search history.

(56) References Cited

U.S. PATENT DOCUMENTS

| | | | | |
|---|---|---|---|---|
| 4,449,683 A * | 5/1984 | Gratzer | ..................... | B64C 7/02 244/54 |
| 4,540,143 A * | 9/1985 | Wang | ........................ | B64C 7/02 244/199.1 |
| 4,685,643 A * | 8/1987 | Henderson | ................ | B64C 7/02 244/55 |
| 5,058,617 A * | 10/1991 | Stockman | .............. | B64D 33/02 137/15.1 |
| 5,156,362 A * | 10/1992 | Leon | ...................... | B64D 33/02 244/130 |
| 6,708,711 B2 * | 3/2004 | Surply | ................... | B64D 33/02 137/15.1 |
| 8,181,912 B2 * | 5/2012 | Schwetzler | ............ | B64D 29/02 244/199.1 |
| 10,723,445 B2 * | 7/2020 | Binks | ..................... | B64D 29/00 |

\* cited by examiner

*Primary Examiner* — Sizo B Vilakazi
(74) *Attorney, Agent, or Firm* — Kolitch Romano Dascenzo Gates LLC

(57) ABSTRACT

An inlet for a nacelle housing a gas turbine engine generating thrust and having an engine centerline, the inlet including a highlight comprising a leading edge of the inlet, wherein the highlight has an outboard side and an inboard side; and the outboard side is forward of the inboard side of the highlight so as to increase an airflow into the inlet and allow increased alignment of a thrust vector of the thrust with the engine centerline.

20 Claims, 6 Drawing Sheets

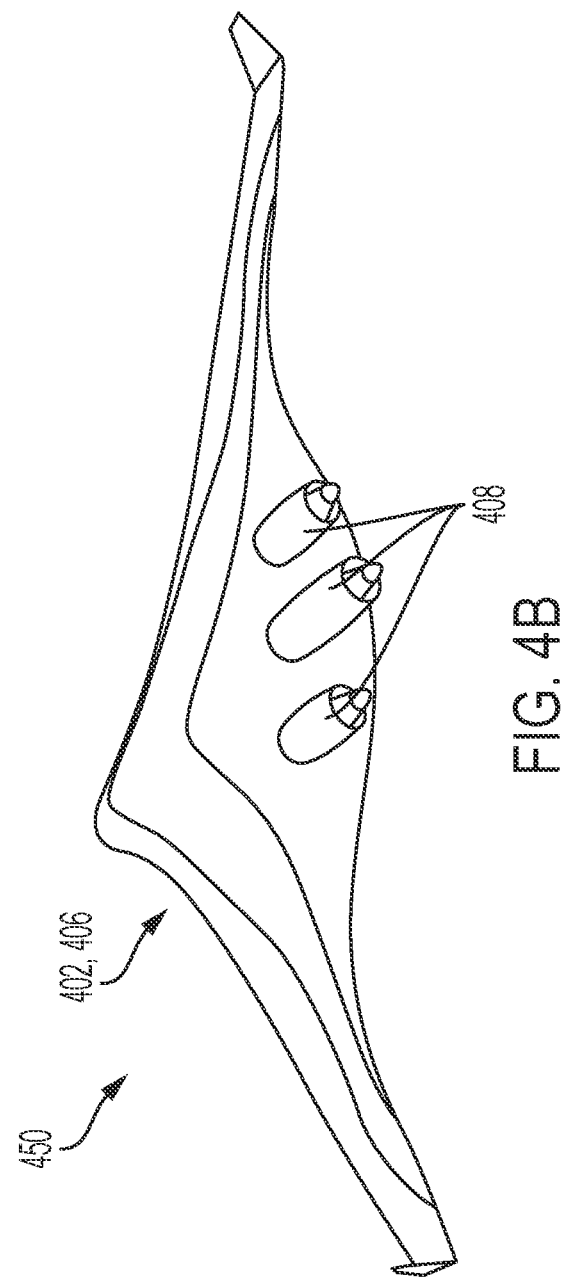

NACELLE INLET WITH HORIZONTAL DROOP (NIHD)

CROSS REFERENCE TO RELATED APPLICATIONS

This application claims the benefit under 35 U.S.C. Section 119(e) of and commonly-assigned U.S. Provisional Patent Application No. 63/159,708, filed Mar. 11, 2021, by Chen Chuck and Brian S. Kornegay, entitled "NACELLE INLET WITH HORIZONTAL DROOP (NIHD)," which application is incorporated by reference herein.

BACKGROUND

1. Field

The present disclosure relates to aircraft engine nacelles and inlets and methods of making the same.

2. Description of the Related Art

FIG. 1 is a schematic view of an exemplary aircraft engine pod 60 including a nacelle 62 and a gas turbine engine 61. The gas turbine engine 61 includes a fan 64, a compressor 66, a combustor 68, and a turbine 70. Engine pod 60 is typically attached to the wings or fuselage of an aircraft through appropriate mountings, for example, a pylon 71. Nacelle 62 includes an engine inlet 72 defining an air intake duct 78 for supplying air 55 to the fan 64, which subsequently is directed both to the bypass duct and engine core, comprising the compressor 66, combustor 68 and turbine 70. Bypass flow outputted from the bypass duct 10 and exhaust from the combustor combine to generate thrust having a thrust vector 73. The fan 64, comprising a hub 63 and fan blades 65 attached to the hub 63, draws the air 55 into the bypass duct 10 and the engine core when the hub 63 is driven by the gas turbine engine 61 about a central longitudinal axis comprising the engine centerline 80. Typically, the exhaust outputted from the combustor 68 drives the turbine 70 and the turbine 70 drives the hub 63 and the compressor 66 via one or more drive shafts. The drive shafts also rotate around their central longitudinal axis comprising the engine centerline 80.

The aircraft fuselage and wing deflects the airflow to form sidewash. The pylon 71 mounts the nacelle 62 to the wing of the aircraft at an engine toe angle 75 aligning the inlet 72 to the direction of the local airflow field (the sidewash) in order to increase flow of air into the gas turbine engine 61. Typically, the engine toe angle 75 (between the engine centerline 80 and the longitudinal axis 82 of the fuselage) is in a range of 1-2 degrees. However, there is a need for continued research and development efforts in the field of improving thrust output in the presence of sidewash. The present disclosure satisfies this need.

SUMMARY

Illustrative, non-exclusive examples of inventive subject matter according to the present disclosure are described in the following enumerated paragraphs:

A1. An aircraft part, comprising:
an inlet for a nacelle housing a gas turbine engine, the gas turbine engine having an engine centerline and generating a thrust having a thrust vector; the inlet further comprising:
a highlight comprising an inlet leading edge of the inlet, wherein:
the highlight has an outboard side and an inboard side; and
the outboard side is forward of the inboard side so as to increase an airflow into the inlet and allow increased alignment of the thrust vector with the engine centerline.

A2. The aircraft part of paragraph A1, wherein the highlight lies in a plane inclined at an angle with respect to the engine centerline.

A3. The aircraft part of paragraph A2, wherein the angle is in a range of half a degree to 3 degrees.

A4. The aircraft part of paragraph A2, wherein the angle is equal to an engine toe angle.

A5. The aircraft part of paragraph A4, wherein the airflow comprises a sidewash deflection and the angle is tuned to increase an input of the sidewash deflection into the inlet.

A6. An aircraft engine comprising the aircraft part of any of the paragraphs A1-A5, further comprising:
the nacelle housing the gas turbine engine and a fan inputting a portion of the airflow into the gas turbine engine, the fan comprising a hub connected to fan blades; and
the inlet comprising:
an inboard length comprising a first perpendicular distance from a plane, comprising a leading edge of the hub, to the inlet leading edge on the inboard side,
an outboard length comprising a second perpendicular distance from the plane to the inlet leading edge on the outboard side, and wherein the outboard length is longer than the inboard length.

A7. An aircraft comprising the aircraft engine of paragraph A6.

A8. The aircraft of paragraph A7, wherein the aircraft comprises a wing and a fuselage, the aircraft further including a mount mounting the aircraft engine to at least one of the wing or the fuselage such that the engine centerline is at an engine toe angle within 1 degree from a longitudinal axis of the fuselage.

A9. The aircraft engine of paragraph A8, wherein the engine centerline is parallel to a longitudinal axis of the fuselage.

A10. The aircraft engine of any of the examples A1-A9, wherein the airflow comprises a sidewash deflection deflected by the fuselage and an angle of inclination of the highlight with respect to the engine centerline is tuned to compensate for the sidewash deflection and match the airflow into the gas turbine engine for increased thrust in a presence of the sidewash deflection.

A11. The aircraft engine of any of the paragraphs A1-A10, wherein the nacelle is symmetrical about the centerline aft of a predetermined position.

A12. The aircraft engine of any of the paragraphs A1-A11, wherein a curvature of the nacelle is blended to increase aerodynamics of flow of air around the nacelle.

A13. The aircraft engine of any of the examples A1-A12, wherein the aircraft comprises a flying wing and the wing includes the fuselage.

A14. The aircraft engine of any of the examples A1-A13, wherein the aircraft engine is mounted to the wing.

A15. A method of making an aircraft part, comprising:
fabricating an inlet for a nacelle housing a gas turbine engine, the gas turbine engine having an engine centerline and generating a thrust having a thrust vector; wherein the inlet comprises:

a highlight comprising an inlet leading edge of the inlet, wherein:

the highlight has an outboard side and an inboard side; and the outboard side is forward of the inboard side so as to increase an airflow into the inlet and allow increased alignment of the thrust vector with the engine centerline.

A16. The method of paragraph A15, further comprising:

attaching the inlet to nacelle or fabricating a nacelle having the inlet;

housing the gas turbine engine and a fan in the nacelle so that the fan inputs a portion of the airflow into the gas turbine engine, the fan comprising a hub connected to fan blades; and wherein fabricating the inlet further comprises fabricating the inlet having:

an inboard length comprising a first perpendicular distance from a plane, comprising a hub leading edge the hub, to the inlet leading edge on the inboard side, an outboard length comprising a second perpendicular distance from the plane to the inlet leading edge on the outboard side, and wherein the outboard length is longer than the inboard length.

A17. The method of paragraph A16, further comprising mounting the nacelle to an aircraft comprising a wing and a fuselage using a mount, wherein the mount mounts the aircraft engine: (1) so that the engine centerline is parallel to a longitudinal axis of the fuselage or (2) at an engine toe angle within 1 degree of the longitudinal axis.

A18. The method of paragraph A15, wherein the highlight lies in a plane inclined at an angle with respect to the engine centerline.

A19. The method of paragraph A18, wherein the angle is in a range of half a degree to 3 degrees.

A20. The method of paragraph A18, wherein the angle is equal to an engine toe angle, the airflow comprises a sidewash deflection, and the angle is tuned to increase an input of the sidewash deflection into the inlet.

BRIEF DESCRIPTION OF THE DRAWINGS

FIG. 4B is a schematic illustration of a flying wing propelled by aircraft engines having an inlet according to one or more examples described herein.

DESCRIPTION

In the following description, reference is made to the accompanying drawings which form a part hereof, and which is shown, by way of illustration, several embodiments. It is understood that other embodiments may be utilized and structural changes may be made without departing from the scope of the present disclosure.

Technical Description

Figure 1:
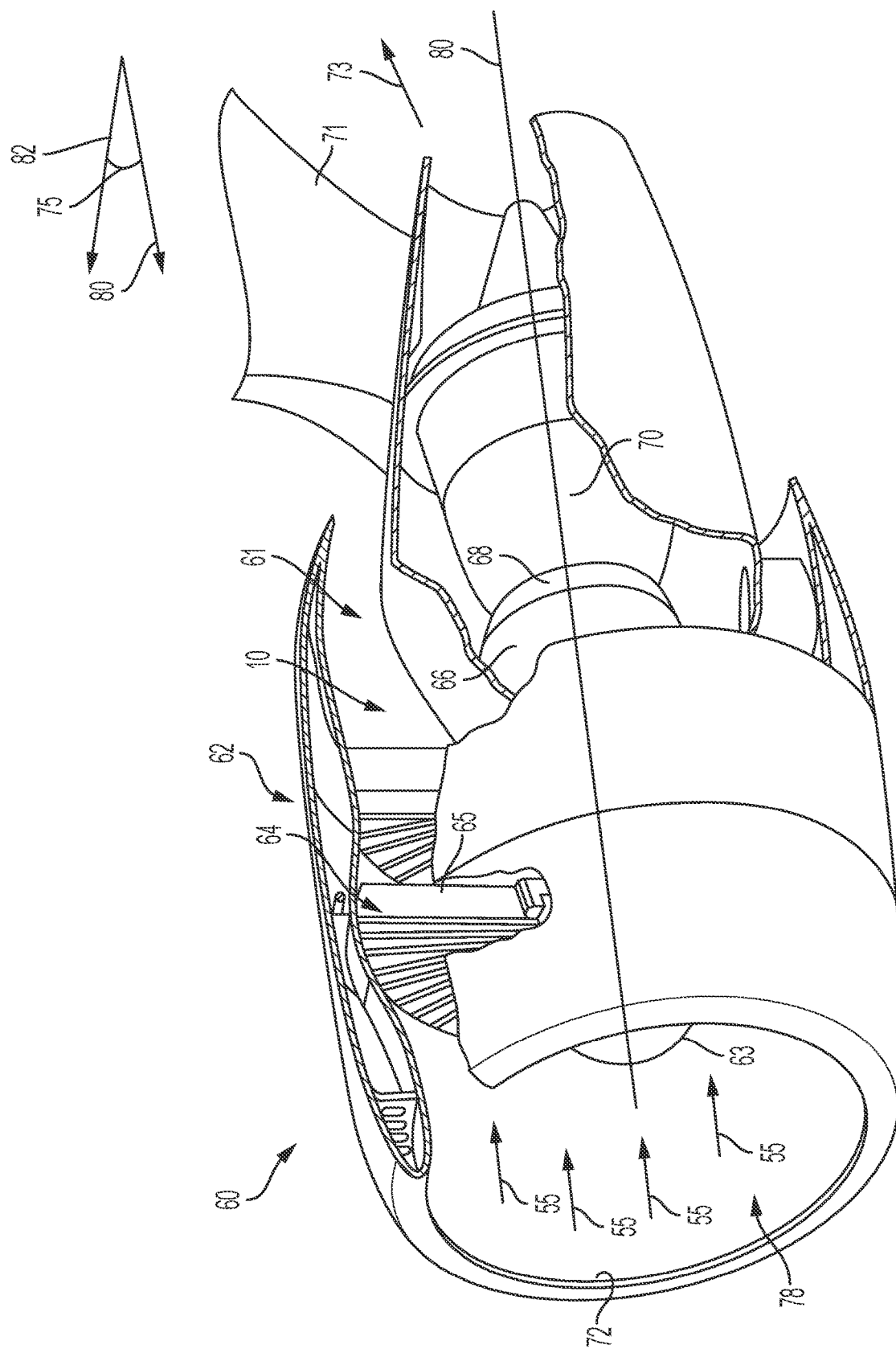
FIG. 1 is a schematic illustration of an aircraft engine.

FIG. 1 illustrates the pylon 71 rotates the entire engine pod 60 by the engine toe angle 75 so as to increase alignment of the inlet with the sidewash and increase flow of air into the intake duct 78. However, rotation of the entire engine pod 60 points the thrust vector 73 of the thrust in a non-optimal direction (i.e., the thrust vector 73 is no longer parallel to the direction of desired propagation).

The present disclosure describes a horizontally drooped inlet that aligns just the inlet and/or a forward portion of the nacelle while keeping the back of the nozzle pointing in a more optimal direction (e.g., parallel to the engine centerline) so as to increase overall performance of the engine and reduce fuel consumption. An example inlet is described in the following sections.

Example Inlet

Figure 2C:
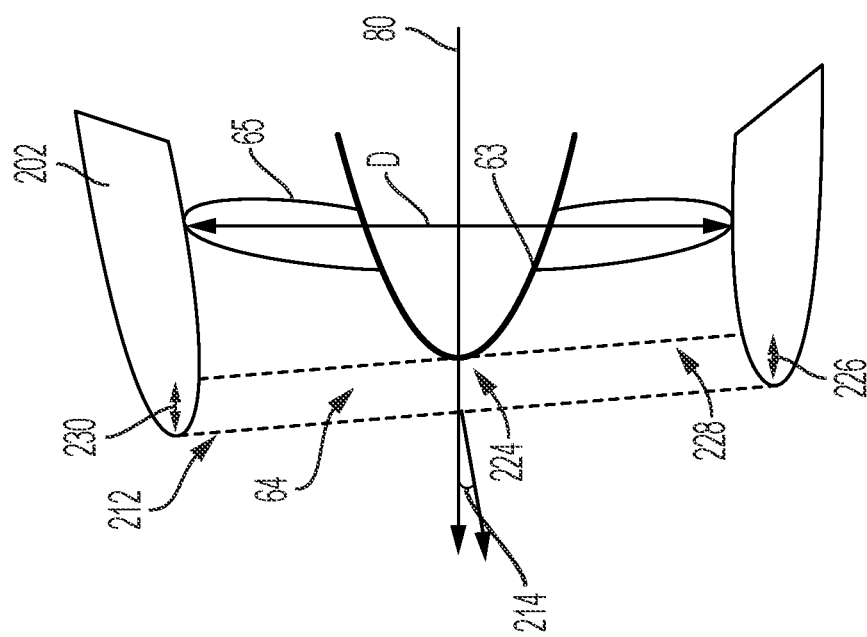
FIG. 2C is a cross-sectional view of an example inlet coupling airflow into a fan of a gas turbine engine.
Figure 2B:
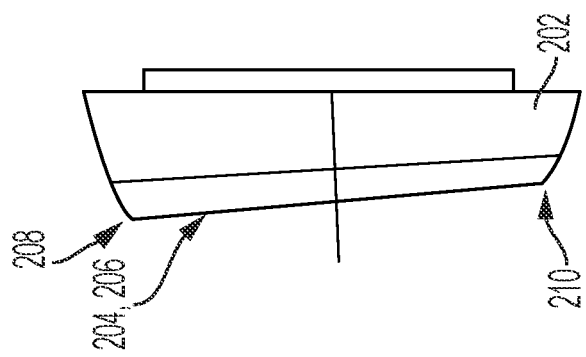
FIG. 2B is cross-sectional view of an example inlet.
Figure 2A:
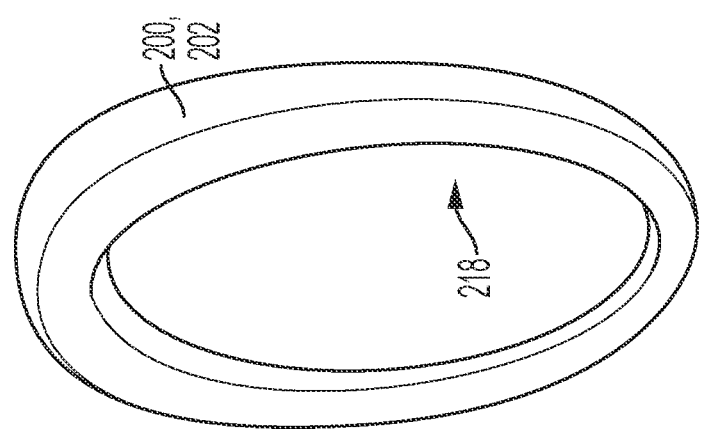
FIG. 2A is a perspective view of an example inlet.

FIGS. 2A-2B illustrate an aircraft part 200 comprising an inlet 202 for a nacelle. The inlet 202 comprises an inlet leading edge 204 (also known as a highlight 206), the highlight 206 has an outboard side 208 and an inboard side 210, and the outboard side 208 is forward of the inboard side 210.

FIG. 2C illustrates the highlight 206 lies in a first plane 212 inclined at an angle 214 with respect to the engine centerline 216. Example angles 214 include, but are not limited to, an angle 214 in a range of half a degree to 3 degrees, an angle 214 equal to an engine toe angle 75, or an angle 214 tuned to increase an input of the airflow 218 (comprising a sidewash deflection) into the inlet 202.

FIG. 2C further illustrates the dimensions of the inlet 202 relative to the fan 64 inputting a portion of airflow 218 into the gas turbine engine (e.g., 61 in FIG. 1). The fan 64 having a diameter D comprises a hub 63 (comprising a hub leading edge 224) and the inlet 202 comprises an inboard length 226 and an outboard length 230. The inboard length comprises a first perpendicular distance from a second plane 228, comprising the hub leading edge 224, to the inlet leading edge 204 on the inboard side 210. The outboard length 230 comprises a second perpendicular distance from the second plane 228 to the inlet leading edge 204 on the outboard side 208, such that the outboard length 230 is longer than the inboard length 226.

Example Nacelle

Figure 3B:
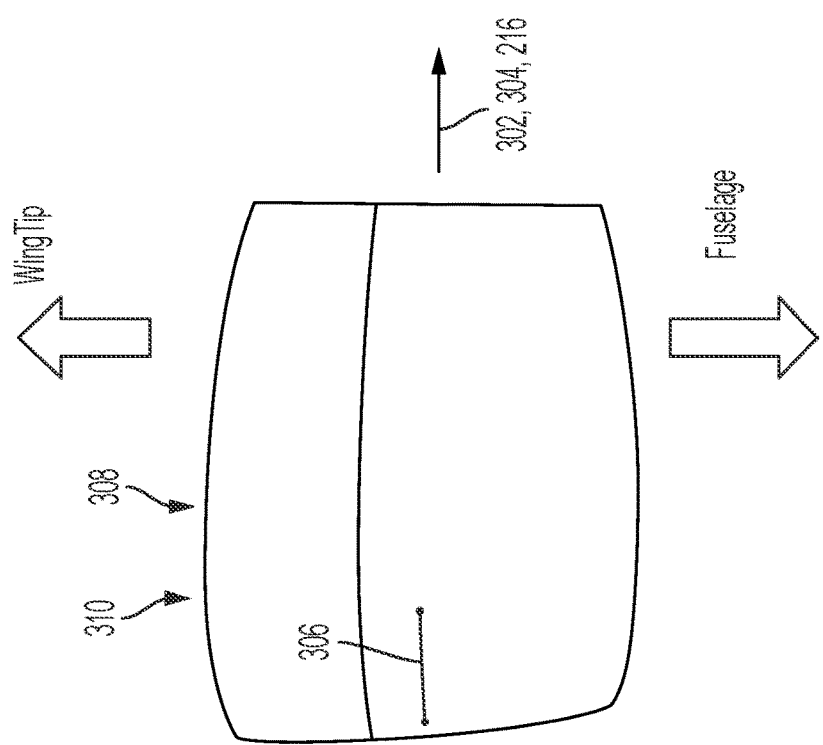
FIG. 3B is a top view of the nacelle illustrated in FIG. 3A.
Figure 3A:
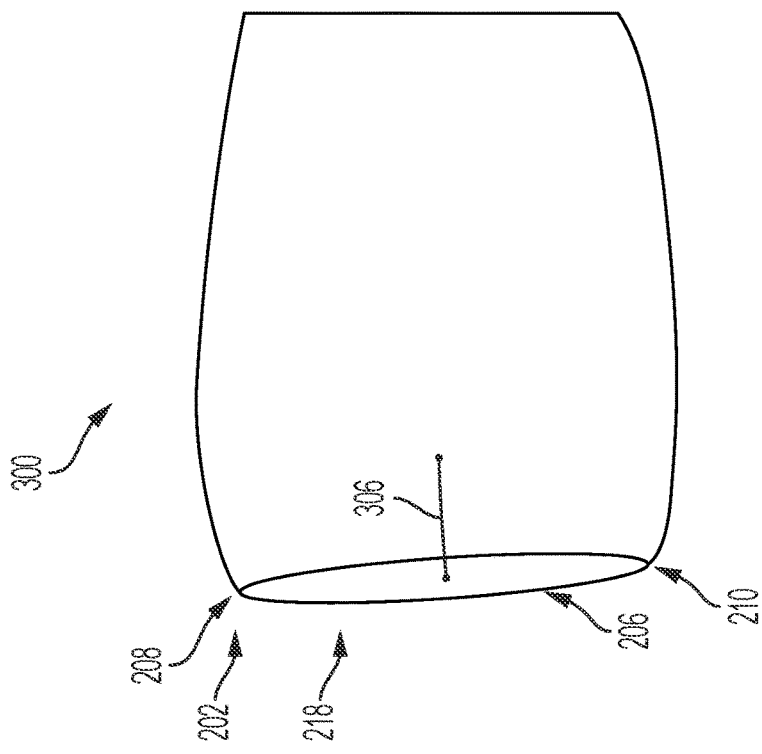
FIG. 3A is a side view of an example nacelle, as viewed from the fuselage towards the wingtip when the nacelle is mounted to the wing, wherein front and back indicates the front and the back of the nacelle respectively.

FIG. 3A and FIG. 3B illustrates an example nacelle 300 including the inlet 202. The nacelle 300 houses a gas turbine engine (e.g., 61 in FIG. 1) having the engine centerline 216 (which is the same as the engine centerline 80 comprising central longitudinal axis of drive shaft) and generating a thrust 302 having a thrust vector 304. As illustrated in FIG. 3A (referring also to FIGS. 2B-2C) the outboard side 208 of the inlet 202 is forward of the inboard side 210 of the inlet 202, so that the inlet 202 has an inlet centerline 306 aligned inboard or inwards toward the fuselage, so as to increase an airflow 218 into the inlet 202 and allow increased alignment of the thrust vector with the engine centerline when the airflow 218 comprises sidewash.

FIGS. 3A and 3B further illustrate the outboard side 208 comprises a point on the highlight 206 furthest from the fuselage (402 in FIG. 4A) or closest to the tip of the wing (wingtip 450 in FIG. 4) when the nacelle 300 is mounted on the wing; and the inboard side 210 comprises a point on the highlight 206 closest to the fuselage 402 and furthest from the wingtip 450.

In one or more examples, the nacelle is symmetrical about the engine centerline aft of a predetermined position 308 and/or a curvature 310 of the nacelle is blended to increase aerodynamics in flow around the nacelle.

Example Aircraft

Figure 4A:
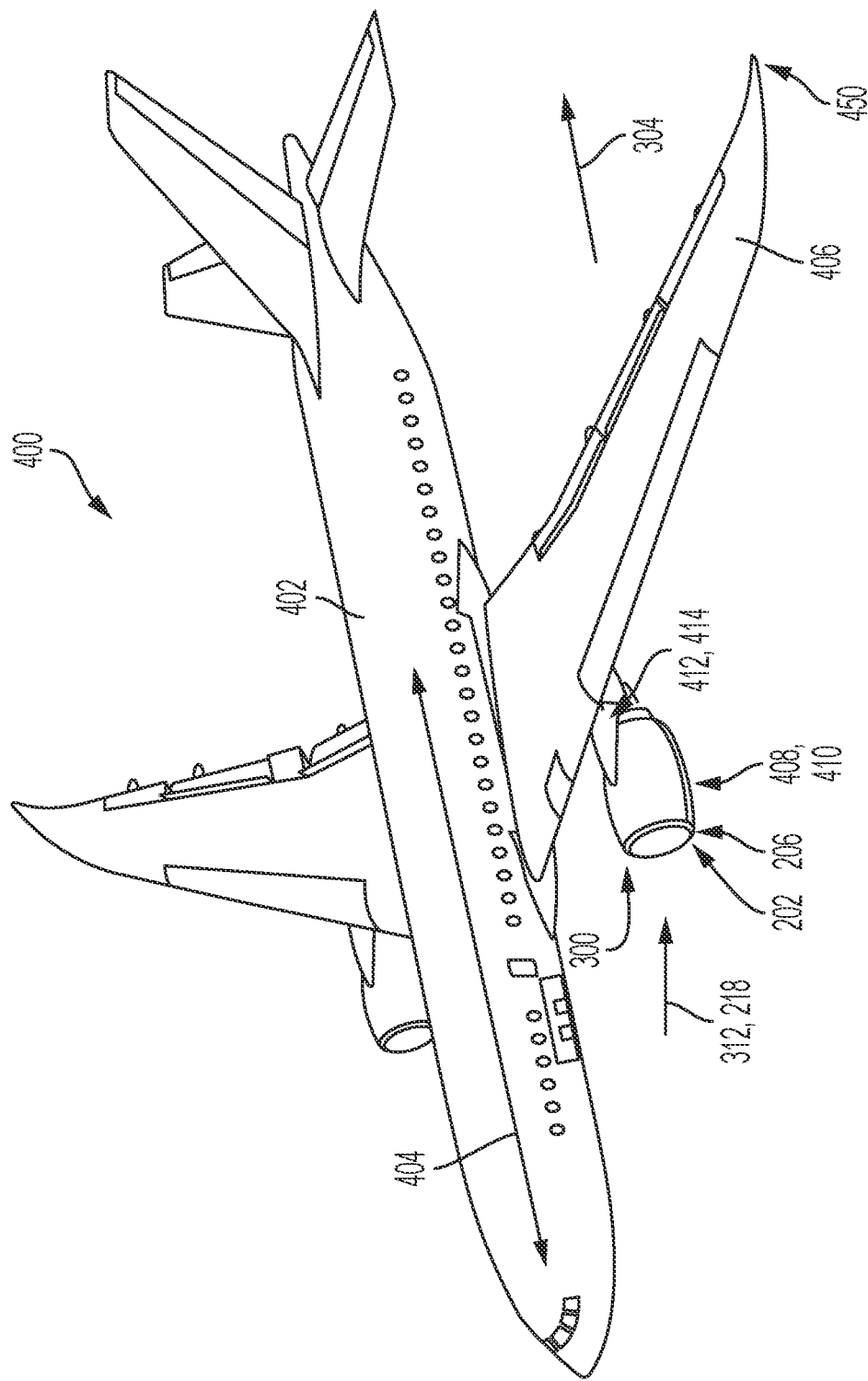
FIG. 4A is a schematic illustration of an aircraft propelled by an aircraft engine having an inlet according to one or more examples described herein.

FIG. 4A illustrates an aircraft 400 comprising a fuselage 402 having a longitudinal axis 404, wings 406 attached to the fuselage 402, and aircraft engines 408 comprising engine pods 410 mounted to the wings, wherein each engine pod 410 is mounted to the wing via a mount 412 (e.g., a pylons 414). The engine pods 410 each comprise an inlet 202 and nacelle 300 housing a gas turbine engine (e.g., 61 in FIG. 1) according to embodiments described herein. In one or more examples, the mounts 412 mount the engine pods 410 so that the thrust vector 304, generated by the exhaust outputted from the gas turbine engine, is parallel to the engine centerline 216 and the engine centerline 216 is parallel to the longitudinal axis 404 of the fuselage 402 (i.e., the engine toe angle 75 is zero). In one or more examples, reducing the engine toe angle 75 from 1 degree to 0 degrees toe while using an inlet 202 as described herein reduces fuel consumption by ~0.2%. In other examples, the engine pod 410 comprising inlet 202 is mounted with a reduced engine toe angle 75 as compared to the engine with the conventional inlet 72 illustrated in FIG. 1.

FIG. 4A further illustrates a sidewash deflection 312 comprising airflow 218 deflected by the fuselage 402. As illustrated in FIG. 2B, the angle 214 of inclination of the highlight 206 with respect to the engine centerline 80 is tuned to compensate for the sidewash deflection 312 and match the airflow 218 into the gas turbine engine 61 for increased thrust in a presence of the sidewash deflection.

FIG. 4B illustrates an example wherein the aircraft 400 comprises a flying wing 450 and the wing 406 includes the fuselage 402. Aircraft engines 408 comprising the inlet 202 are mounted to the flying wing.

Example Process Steps

Figure 5:
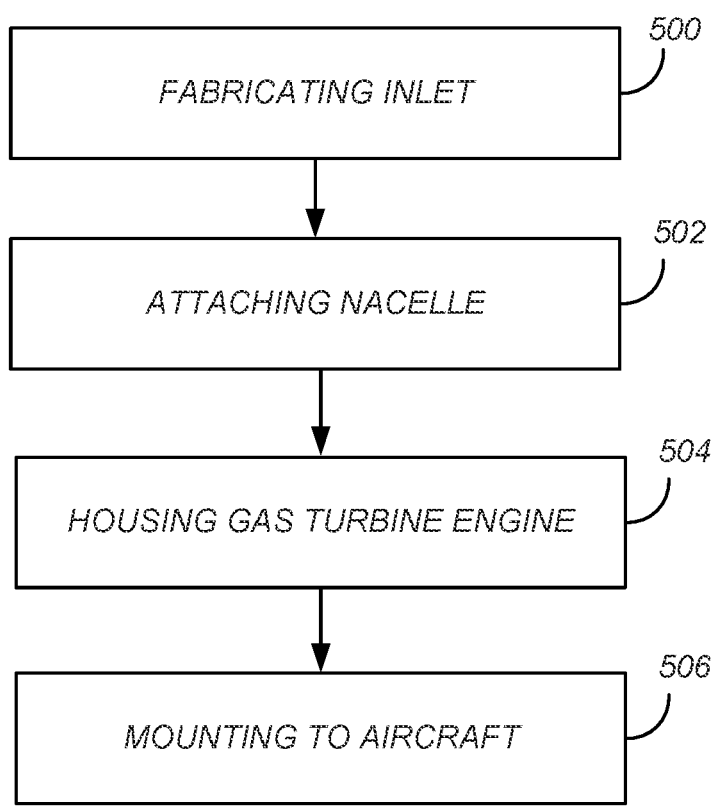
FIG. 5 is a flowchart illustrating a method of making an inlet, a nacelle, and an aircraft according to one or more examples described herein.

FIG. 5 is a flowchart illustrating a method of making an inlet, a nacelle, an aircraft engine, and an aircraft.

Block 500 fabricating the inlet for a nacelle housing a gas turbine engine, the gas turbine engine having an engine centerline and generating a thrust having a thrust vector. The inlet is fabricated so that the inlet comprises a highlight comprising an inlet leading edge, the highlight has an outboard side and an inboard side, and the outboard side is forward of the inboard side of the highlight so as to increase the airflow into the inlet and allow increased alignment of the thrust vector with the engine centerline. In some examples, the inlet has an inboard length comprising a first perpendicular distance from a plane, comprising the hub leading edge, to the inlet leading edge on the inboard side, an outboard length comprising a second perpendicular distance from the plane to the inlet leading edge on the outboard side, and the outboard length is longer than the inboard length.

Block 502 represents attaching the inlet to a nacelle or fabricating the nacelle having the inlet.

Block 504 represents housing a gas turbine engine (having an engine centerline) and a fan in the nacelle so that the fan inputs a portion of the airflow into the gas turbine engine.

Block 506 represents mounting the aircraft engine to an aircraft, comprising a wing and a fuselage, using a mount. In various examples, the mount mounts the aircraft engine so that the thrust vector is parallel to the engine centerline.

Illustrative, non-exclusive examples of inventive subject matter according to the present disclosure are described in the following enumerated paragraphs:

A1. An aircraft part (200), comprising:
an inlet (202) for a nacelle (300) housing a gas turbine engine (61), the gas turbine engine (61) having an engine centerline (216) and generating a thrust (302) having a thrust vector (304), the inlet (202) further comprising:
a highlight (206) comprising an inlet leading edge (204) of the inlet (202), wherein:
the highlight (206) has an outboard side (208) and an inboard side (210); and
the outboard side (208) is forward of the inboard side (210) so as to increase an airflow (218) into the inlet (202) and allow an increased alignment of the thrust vector (304) with the engine centerline (216).

A2. The aircraft part (200) of paragraph A1, wherein the highlight (206) lies in a plane (212) inclined at an angle (214) with respect to the engine centerline (216).

A3. The aircraft part (200) of paragraph A2, wherein the angle (214) is in a range of half a degree to 3 degrees (e.g., $0.5° \leq angle \leq 3°$).

A4. The aircraft part (200) of paragraph A1 or A2, wherein the angle (214) is equal to an engine toe angle (75).

A5. The aircraft part (200) of paragraph A4, wherein the airflow (218) comprises a sidewash deflection (312) and the angle (214) is tuned to increase an input of the sidewash deflection (312) into the inlet (202).

A6. An aircraft engine (408) comprising the aircraft part (200) of any of the paragraphs A1-A5, further comprising:
the nacelle (300) housing the gas turbine engine (61) and a fan (64) inputting a portion of the airflow (218) into the gas turbine engine (61), the fan (64) comprising a hub (63) connected to fan (64) blades and the hub (63) comprising a hub leading edge (224); and
the inlet (202) comprising:
an inboard length (226) comprising a first perpendicular distance from a plane (228), comprising the hub leading edge (224), to the inlet leading edge (204) on the inboard side (210),
an outboard length (230) comprising a second perpendicular distance from the plane (228) to the inlet leading edge (204) on the outboard side (208), and wherein:
the outboard length (230) is longer than the inboard length (226).

A7. An aircraft (400) comprising the aircraft engine (408) of paragraph A6.

A8. The aircraft (400) of paragraph A7, wherein the aircraft (400) comprises a wing (406) and a fuselage (402), the aircraft (400) further including a mount (412) mounting the aircraft engine (408) to at least one of the wing (406) or the fuselage (402), wherein the mount (412) mounts the aircraft engine (408) so that the engine centerline (216) has an engine toe angle (75) of 1 degree or less with respect to a longitudinal axis (404) of the fuselage (402).

A9. The aircraft engine (408) of paragraph A8, wherein the engine centerline (216) is parallel to the longitudinal axis (404) of the fuselage (402).

A10. The aircraft engine (408) of paragraph A8 or A9, wherein the airflow (218) comprises a sidewash deflection (312) deflected by the fuselage (402) and an angle (214) of inclination of the highlight (206) with respect to the engine centerline (216) is tuned to compensate for the sidewash deflection (312) and match the airflow (218) into the gas turbine engine (61) for increased thrust (302) in a presence of the sidewash deflection (312).

A11. The aircraft engine (408) of any of the paragraphs A1-A10, wherein the nacelle (300) is symmetrical about the engine centerline (216) aft of a predetermined position (308).

A12. The aircraft engine (408) of any of the paragraphs A1-A11, wherein a curvature (310) of the nacelle (300) is blended to increase aerodynamics of a portion of the airflow (218) around the nacelle (300).

A13. The aircraft engine (408) of any of the paragraphs A8-A12, wherein the aircraft (400) comprises a flying wing (450) and the wing (406) includes the fuselage (402).

A14. The aircraft engine (408) of any of the paragraphs A8-A13, wherein the aircraft engine (408) is mounted to the wing (406) or an empennage of the aircraft (400).

A15. A method of making an aircraft part (200), comprising: fabricating an inlet (202) for a nacelle (300) housing a gas turbine engine (61), the gas turbine engine (61) having an engine centerline (216) and generating a thrust (302) having a thrust vector (304); wherein the inlet (202) comprises:
  a highlight (206) comprising an inlet leading edge (204) of the inlet (202), wherein:
  the highlight (206) has an outboard side (208) and an inboard side (210); and
  the outboard side (208) is forward of the inboard side (210) so as to increase an airflow (218) into the inlet (202) and allow an increased alignment of the thrust vector (304) with the engine centerline (216).

A16. The method of paragraph A15, further comprising: attaching the inlet (202) to the nacelle (300) or fabricating the nacelle (300) having the inlet (202);
  housing the gas turbine engine (61) and a fan (64) in the nacelle (300) so that the fan (64) inputs a portion of the airflow (218) into the gas turbine engine (61), the fan (64) comprising a hub (63) connected to fan (64) blades and the hub (63) comprising a hub leading edge (224); and wherein fabricating the inlet (202) further comprises fabricating the inlet (202) having:
  an inboard length (226) comprising a first perpendicular distance from a plane (228), comprising the hub leading edge (224), to the inlet leading edge (204) on the inboard side (210),
  an outboard length (230) comprising a second perpendicular distance from the plane (228) to the inlet leading edge on the outboard side (208), and wherein the outboard length (230) is longer than the inboard length (226).

A17. The method of paragraph A15 or A16, further comprising mounting the nacelle (300) to an aircraft (400) comprising a wing (406) and a fuselage (402) using a mount (412), wherein the mount (412) mounts (412) the nacelle (300) so that the engine centerline (216) has an engine toe angle (75) angle (214) of 1 degree or less with respect to a longitudinal axis (404) of the fuselage (402).

A18. The method of any of the paragraphs A15-A17, wherein the highlight (206) lies in a plane (212) inclined at an angle (214) with respect to the engine centerline (216).

A19. The method of paragraph A18, wherein the angle (214) is in a range of half a degree to 3 degrees (e.g., 0.5°≤angle≤3°).

A20. The method of paragraph A18 or A19, wherein the angle (214) is equal to an engine toe angle (75), the airflow (218) comprises a sidewash deflection (312), and the angle (214) is tuned to increase an input of the sidewash deflection (312) into the inlet (202).

A21. A jet engine, comprising a nacelle inlet with a horizontal droop (NIHD), where the inlet is drooped to the fuselage side of the aircraft, and where the engine inlet and forward portion of the nacelle are aligned horizontally enabling an optimum pointing of the nozzle of the jet engine.

A22. The inlet (202) of any of the examples, comprising a solid of revolution about an axis of revolution comprising the engine centerline (216).

Those skilled in the art will recognize many modifications may be made to this configuration without departing from the scope of the present disclosure. For example, those skilled in the art will recognize that any combination of the above components, or any number of different components, peripherals, and other devices, may be used.

CONCLUSION

This concludes the description of the preferred embodiments of the present disclosure. The foregoing description of the preferred embodiment has been presented for the purposes of illustration and description. It is not intended to be exhaustive or to limit the disclosure to the precise form disclosed. Many modifications and variations are possible in light of the above teaching. It is intended that the scope of rights be limited not by this detailed description, but rather by the claims appended hereto.

What is claimed is:

1. An aircraft part, comprising:
  an inlet for a nacelle housing a gas turbine engine, the gas turbine engine having an engine centerline and generating a thrust having a thrust vector, the inlet further comprising:
  a highlight comprising an inlet leading edge of the inlet, wherein:
  the highlight has an outboard side and an inboard side; and
  the outboard side is forward of the inboard side so as to increase an airflow into the inlet and allow an increased alignment of the thrust vector with the engine centerline.

2. The aircraft part of claim 1, wherein the highlight lies in a plane inclined at an angle with respect to the engine centerline.

3. The aircraft part of claim 2, wherein the angle is in a range of half a degree to 3 degrees.

4. The aircraft part of claim 2, wherein the angle is equal to an engine toe angle.

5. The aircraft part of claim 4, wherein the airflow comprises a sidewash deflection and the angle is tuned to increase an input of the sidewash deflection into the inlet.

6. An aircraft engine comprising the aircraft part of claim 1, further comprising:
  the nacelle housing the gas turbine engine and a fan inputting a portion of the airflow into the gas turbine engine, the fan comprising a hub connected to fan blades and the hub comprising a hub leading edge; and
  the inlet comprising:
  an inboard length comprising a first perpendicular distance from a plane, comprising the hub leading edge, to the inlet leading edge on the inboard side,
  an outboard length comprising a second perpendicular distance from the plane to the inlet leading edge on the outboard side, and wherein
  the outboard length is longer than the inboard length.

7. An aircraft comprising the aircraft engine of claim 6.

8. The aircraft of claim 7, wherein the aircraft comprises a wing and a fuselage, the aircraft further including a mount mounting the aircraft engine to at least one of the wing or the fuselage, wherein the mount mounts the aircraft engine so that the engine centerline has an engine toe angle of 1 degree or less with respect to a longitudinal axis of the fuselage.

9. The aircraft engine of claim 8, wherein the engine centerline is parallel to the longitudinal axis of the fuselage.

10. The aircraft engine of claim 8, wherein the airflow comprises a sidewash deflection deflected by the fuselage and an angle of inclination of the highlight with respect to the engine centerline is tuned to compensate for the sidewash deflection and match the airflow into the gas turbine engine for increased thrust in a presence of the sidewash deflection.

11. The aircraft engine of claim 8, wherein the nacelle is symmetrical about the engine centerline aft of a predetermined position.

12. The aircraft engine of claim 11, wherein a curvature of the nacelle is blended to increase aerodynamics of a portion of the airflow around the nacelle.

13. The aircraft engine of claim 8, wherein the aircraft comprises a flying wing and the wing includes the fuselage.

14. The aircraft engine of claim 8, wherein the aircraft engine is mounted to the wing.

15. A method of making an aircraft part, comprising:
fabricating an inlet for a nacelle housing a gas turbine engine, the gas turbine engine having an engine centerline and generating a thrust having a thrust vector; wherein the inlet comprises:
a highlight comprising an inlet leading edge of the inlet, wherein:
the highlight has an outboard side and an inboard side; and
the outboard side is forward of the inboard side so as to increase an airflow into the inlet and allow an increased alignment of the thrust vector with the engine centerline.

16. The method of claim 15, further comprising:
attaching the inlet to the nacelle or fabricating a nacelle having the inlet;
housing the gas turbine engine and a fan in the nacelle so that the fan inputs a portion of the airflow into the gas turbine engine, the fan comprising a hub connected to fan blades and the hub comprising a hub leading edge; and wherein fabricating the inlet further comprises fabricating the inlet having:
an inboard length comprising a first perpendicular distance from a plane, comprising the hub leading edge, to the inlet leading edge on the inboard side,
an outboard length comprising a second perpendicular distance from the plane to the inlet leading edge on the outboard side, and wherein the outboard length is longer than the inboard length.

17. The method of claim 16, further comprising mounting the nacelle to an aircraft comprising a wing and a fuselage using a mount, wherein the mount mounts the nacelle so that the engine centerline has an engine toe angle of 1 degree or less with respect to a longitudinal axis of the fuselage.

18. The method of claim 15, wherein the highlight lies in a plane inclined at an angle with respect to the engine centerline.

19. The method of claim 18, wherein the angle is in a range of half a degree to 3 degrees.

20. The method of claim 18, wherein the angle is equal to an engine toe angle, the airflow comprises a sidewash deflection, and the angle is tuned to increase an input of the sidewash deflection into the inlet.

* * * * *